June 4, 1963 R. S. STRIMEL 3,092,072
LOAD INDICATING APPARATUS
Filed July 31, 1961 5 Sheets-Sheet 1

INVENTOR
Robert S. Strimel
BY
ATTORNEYS

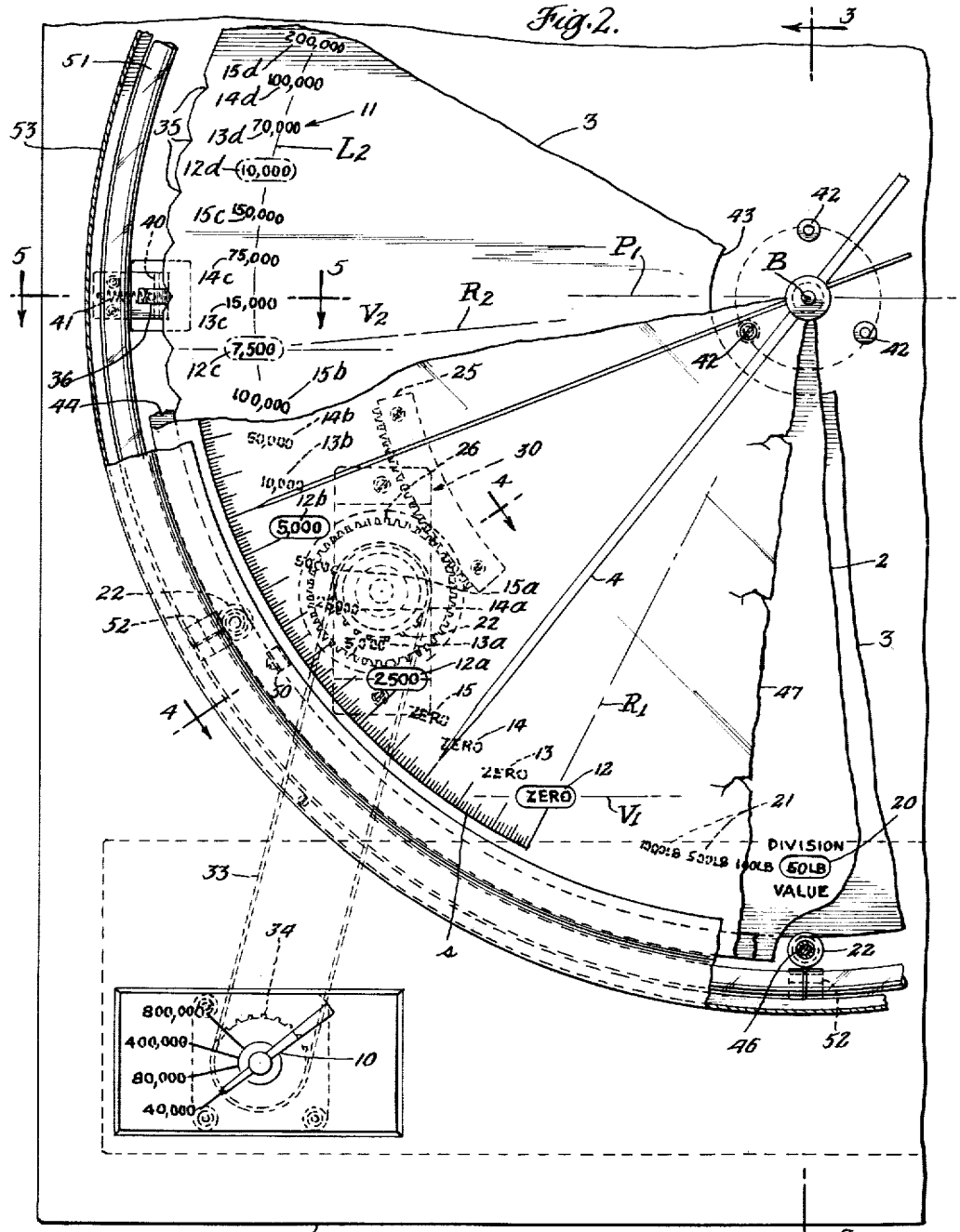

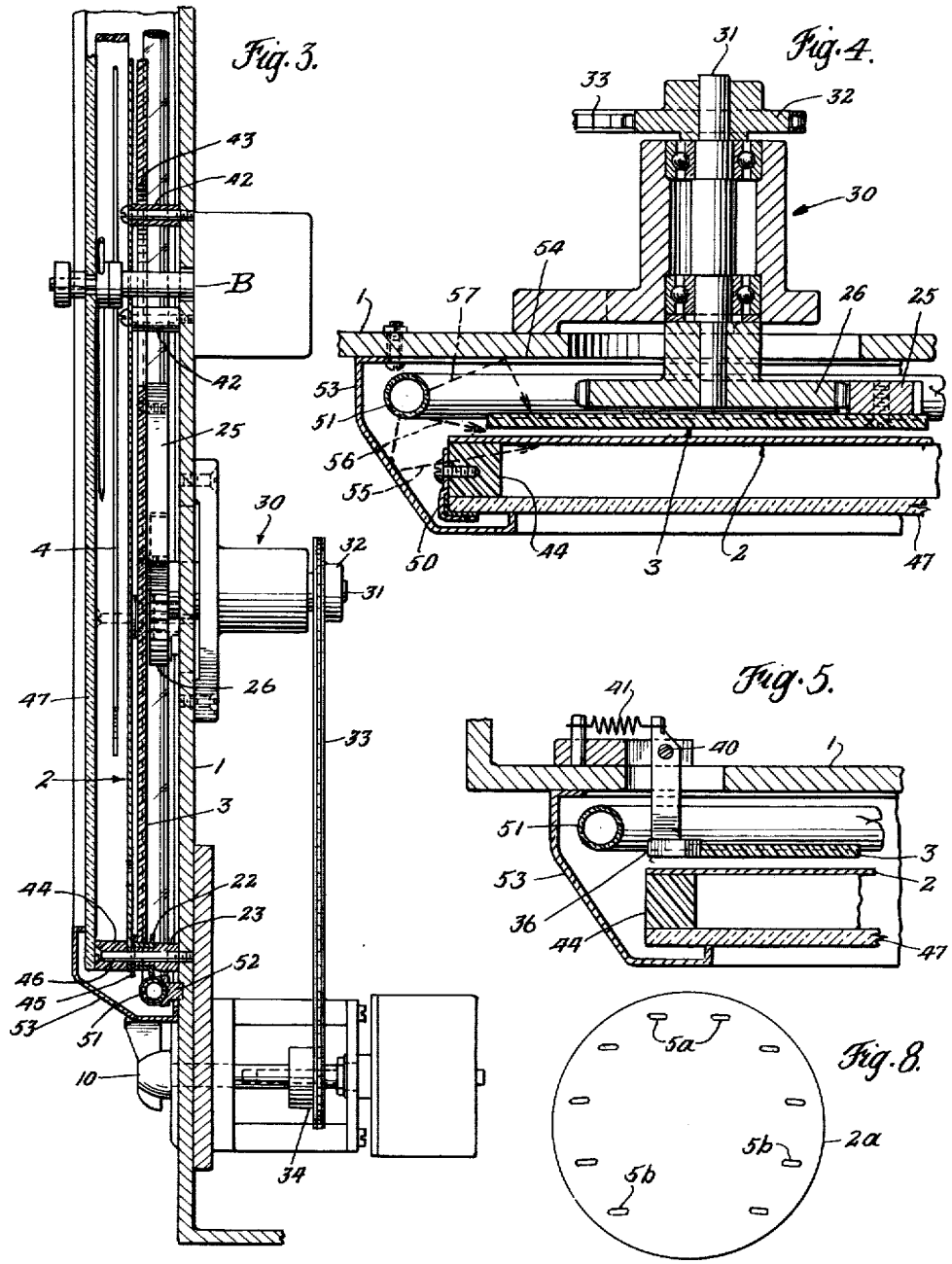

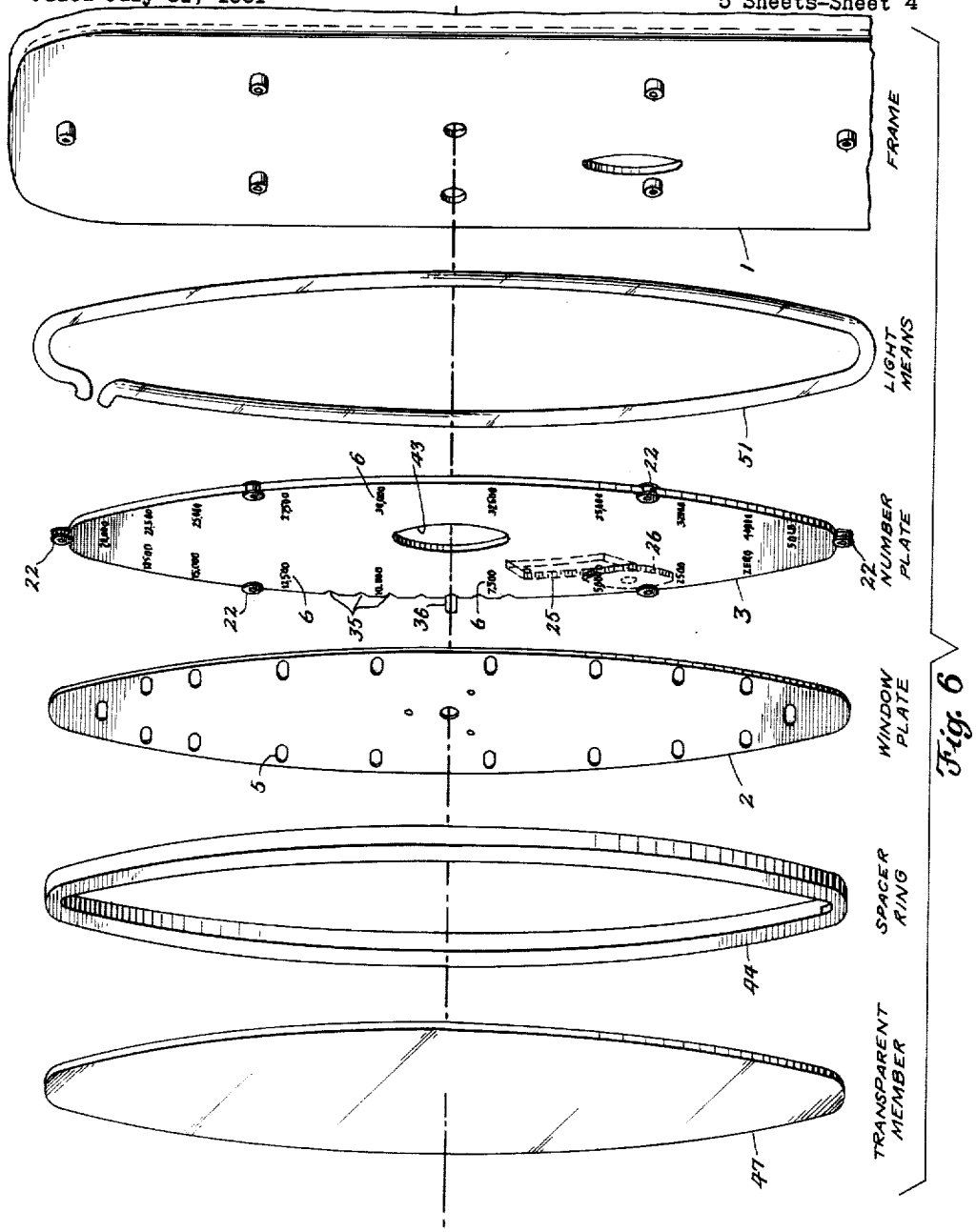

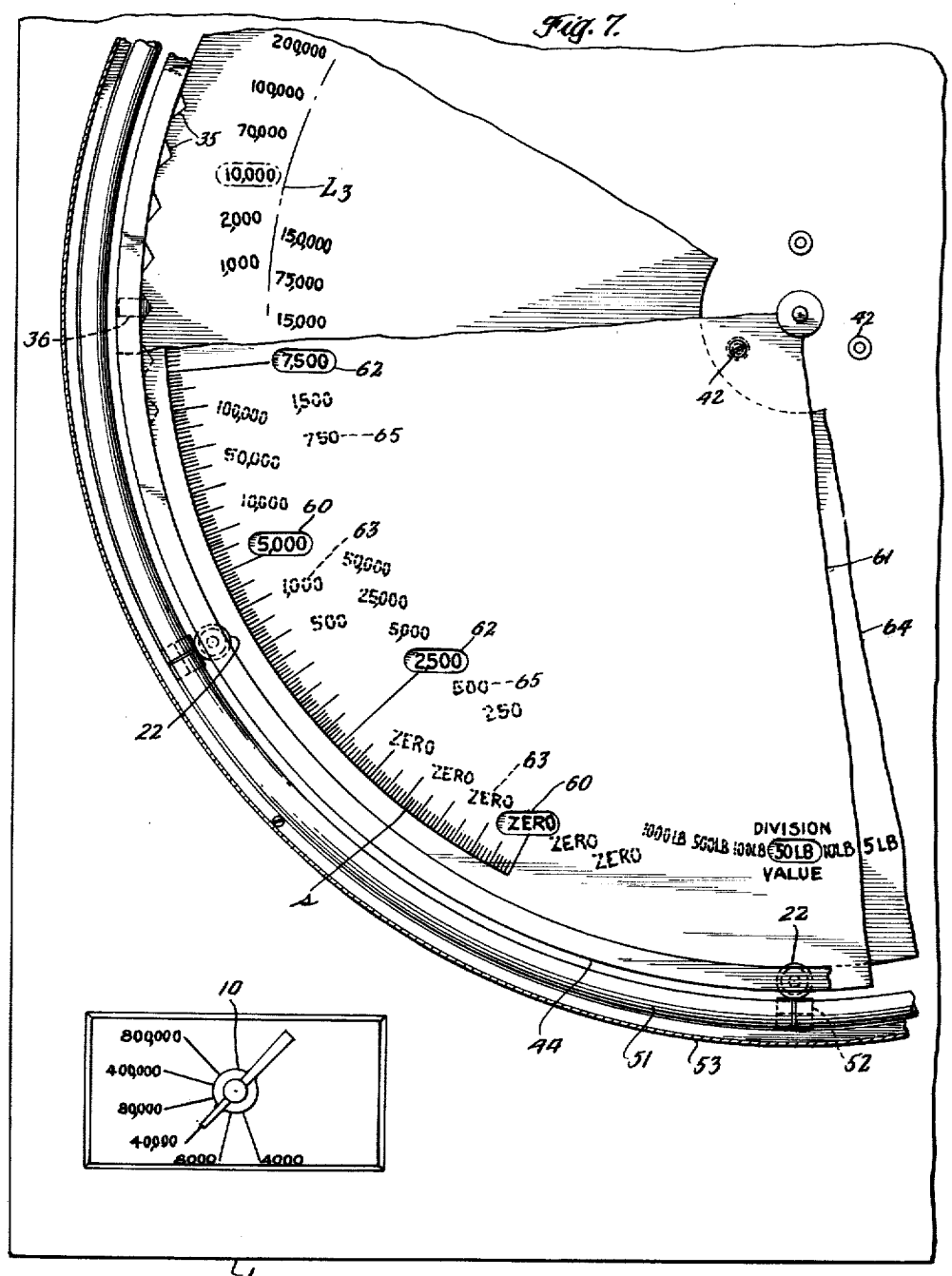

United States Patent Office 3,092,072
Patented June 4, 1963

3,092,072
LOAD INDICATING APPARATUS
Robert S. Strimel, Penllyn, Pa., assignor to Tinius Olsen Testing Machine Company, Willow Grove, Pa., a corporation of Pennsylvania
Filed July 31, 1961, Ser. No. 128,175
4 Claims. (Cl. 116—129)

This invention relates to load indicating apparatus for use with universal testing machines or the like.

The principal object of the invention is to provide for testing machines having a plurality of load ranges, improved load indicating apparatus of the kind wherein only a single set of load value numerals constituting a load range is visible at any one time and all of the visible numerals are oriented in a normal reading position.

The manner in which the foregoing is accomplished together with the various advantages of the invention will be described below in connection with the following drawings wherein:

FIGURE 2 is an enlarged fragmentary front view of the equipment of FIGURE 1 with certain parts broken away;

FIGURE 3 is a vertical fragmentary cross section taken on the line 3—3 of FIGURE 2;

FIGURE 4 is a further enlarged sectional view taken on the line 4—4 of FIGURE 2;

FIGURE 5 is an enlarged fragmentary section on the line 5—5 of FIGURE 2 on a scale similar to FIGURE 4;

FIGURE 6 is an exploded view showing various of the components of FIGURE 1;

FIGURE 7 is a fragmentary view illustrating in particular a window plate and a numeral plate of a modified form of the invention which is particularly useful for a machine having more than the normal number of load ranges; and FIGURE 8 is a view on a reduced scale of a modified window plate.

Figure 1:
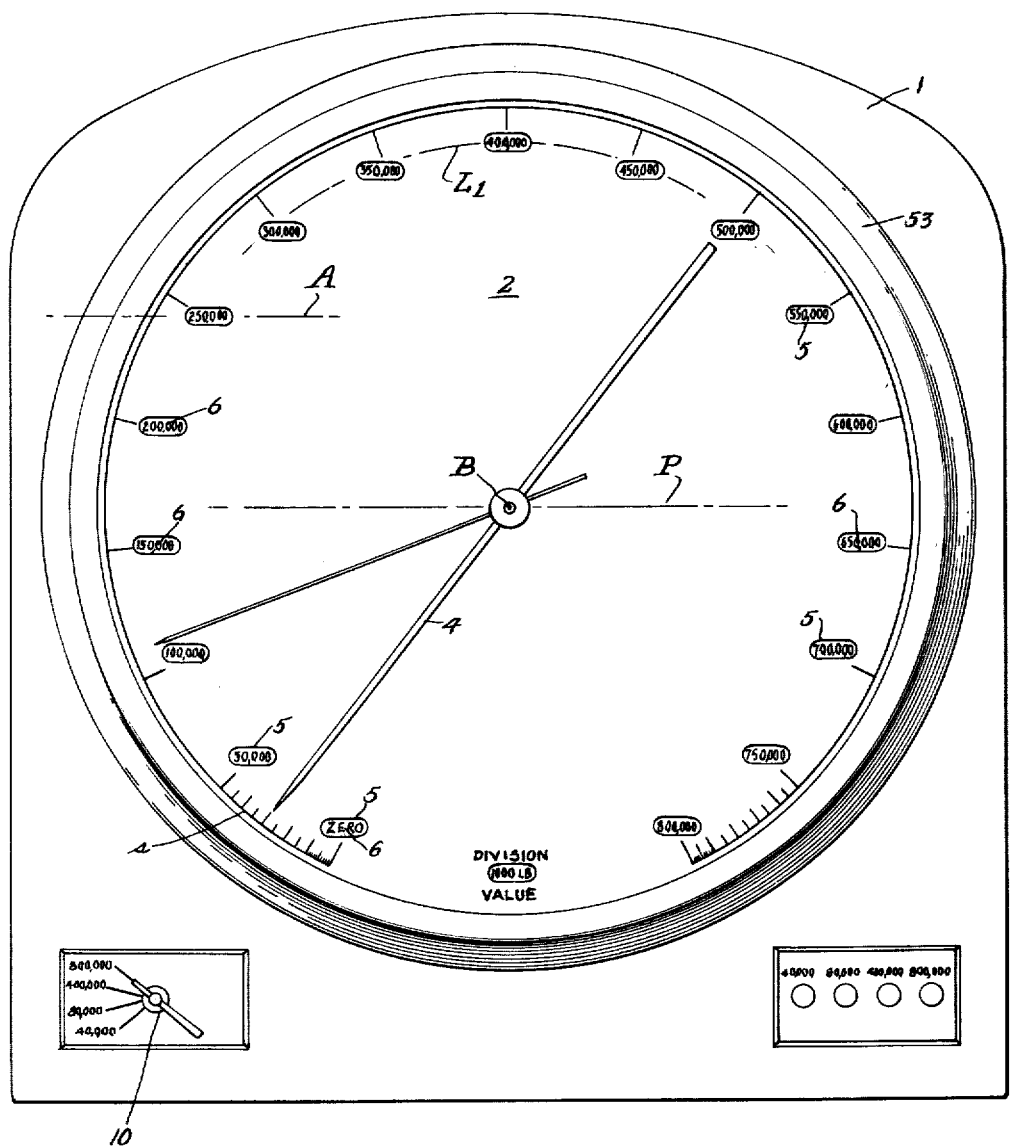
FIGURE 1 is a front elevational view of load indicating equipment embodying the invention.

In FIGURE 1 the indicating equipment includes a frame 1 constructed to be connected with the body of the testing machine (not shown). On the frame is a dial face 2 (hereinafter called "window plate") which is fixed with respect to the frame. The window plate is circular in shape and around the peripheral edge is a scale *s*. Each division in the scale represents a certain value of load. A pointer 4 is adapted to be rotated over the scale in accordance with the amount of load being applied to the test specimen. The frame holds the window plate in a vertical position and the pointer rotates about a horizontal axis B.

The window plate 2 has a plurality of windows or openings 5 disposed around the scale and equally spaced apart. The locus of the openings (indicated by the dotted line $L_1$) is coaxial with the axis B.

Behind the window plate 2 is mounted a numeral plate having means forming a plurality of numerals some of which are viewable through the windows as indicated at 6. (Incidentally, the zero load indication is in terms of letters forming the word "zero" but for present purposes, however, these letters can be considered as numerals. From an operator's standpoint it is more suitable to spell out zero load rather than using the indication "0.")

The various numerals 6 comprise a group or set of numerals which constitute load values of particular load range, for example, in FIGURE 1 the load range is from zero to 800,000 lbs. These load values are used in conjunction with the scale 3. When it is desired to use the testing machine within a different load range, the numeral plate is adjusted so as to bring the numerals comprising the group for the particular desired range in alignment with the windows 5 so that the numerals are visible. For example, when the machine is to be used in the zero to 400,000 lb. range, the range-change knob 10 is adjusted to the 400,000 lb. setting. This knob is interconnected to the numeral plate and rotates the same so that the numbers corresponding to the 400,000 lb. range appear in the window. A similar effect takes place when the range-change knob 10 is adjusted for the 80,000 lb. or 40,000 lb. ranges.

An important feature of the invention is that the numerals appearing in the various windows are in a normal reading position; for example, as shown in FIGURE 1 the numerals are all horizontally oriented. Further, only the numerals corresponding to the load range in use are visible. The numerals for the other ranges are masked out. The foregoing is accomplished by the orientation of the openings on the window plate 2 and the orientation of the various numerals on the window plate.

With respect to the openings 5 it will be seen in FIGURE 1 that each opening is elongated and its axis, for example the axis A, extends horizontally or parallel to a horizontal plane P containing the axis B. The orientation of the numerals on the numeral plate will be discussed in connection with FIGURE 2.

The numeral plate 3 is disk-like in form and about the peripheral area of the plate is means forming a plurality of numerals 11. The numerals 12, 12a, 12b, 12c, 12d, etc., constitute a group or set of numerals for a 40,000 lb. range. The numerals 13, 13a, 13b, 13c, 13d, etc., constitutes a group or set of numerals for the 80,000 lb. range load. The numerals 14a, 14b, 14c, 14d, etc., constitute the numerals for the 400,000 lb. load and the numerals 15, 15a, 15b, 15c, 15d, etc., constitute the numerals for the 800,000 lb. load. The locus of these numerals (indicated by the dotted line $L_2$ is coaxial with the axis B).

Each of the numerals lies along the numeral radius and the viewing axis of the numeral is transverse this radius. For example, the numeral "zero" lies along the radius axis $R_1$ and its viewing axis $V_1$ is oriented transversely this radius. The same is true of the other "zeros." Also, by way of example, the numeral 12c (7,500) lies along the radius $R_2$ and its viewing axis $V_2$ is transverse this radius. All the other numerals on the numeral plate are similarly arranged.

The viewing axis of each numeral is oriented with respect to its radius so that as the numeral is brought into alignment with its opening the viewing axis will be oriented for the numeral to be in the normal reading position. It will be apparent that the orientation of the viewing axis depends upon the shape of the opening (the shape must expose the numeral to view) and the location of the opening in the window plate.

The only exception to a transverse orientation of a viewing axis is in an arrangement where the apparatus is constructed so that a window or opening is disposed with its axis containing the plane P. In that event the viewing axis of the numeral contains or is parallel to its numeral radius.

With regard to orienting the numerals so that they appear in the openings in a normal reading position the following is to be observed. In the presently described equipment of the invention each numeral as it appears in its opening is horizontally oriented. This is the desirable or normal position for most types of equipment. It will be appreciated, however, that in certain instances it may be desirable to orient the numerals non-horizontally so that they can be normally observed, i.e., so that the operator does not have to cock or skew his head. Thus in FIGURE 8 I have shown a window plate 2a wherein the openings 5a are oriented horizontally while the openings 5b are oriented slightly from the horizontal. The various numerals as they appear in the openings partake of the same orientation.

In connection with the various load ranges I have provided means for indicating the particular load value of the divisions of the scale. With reference to FIGURE 2 it will be seen that the window plate has an opening 20 used in conjunction with the several numerals 21 on the numeral plate. When the 40,000 lb. range is used the numeral 50 appears in the window 20 which means that the value of each division on the scale is 50 lbs. When the 80,000 lb. range is used the 600 lb. numeral appears in the window 20 indicating that each division in the scale represents 600 lbs. It is to be noted that each numeral 21 lies along a numeral radius and its viewing axis is oriented transversely of the numeral radius.

It will be apparent from the foregoing that I have provided a highly desirable and useful load indicating apparatus for a testing machine because the masking out of the numerals not in use eliminates any change of error in misreading and orienting the numerals in the normal reading position not only enhances the facility and ease with which the machine can be operated but also minimizes the chance of reading error. The structural details of a typical arrangement for accomplishing the foregoing will next be described.

With reference to FIGURES 2 and 3, a generally planar part of the frame 1 carries a plurality of flange type rollers 22 which are arranged in circular fashion on the frame. The numeral plate 3 rests within and is rotatably supported by the rollers 22. The rollers support the numeral plate so that the rotational axis of the plate is coaxial with the axis B. The rollers 22 are supported on the blocks 23 in a manner described hereinafter.

As mentioned heretofore the numeral plate is rotated when the range-change knob 10 is moved and the mechanism for accomplishing this is described following.

As best seen in FIGURES 2 and 4 a rack 25 is fixed to the back of the numeral plate and this rack meshes with a pinion 26 supported by bearing structure 30 connected with the frame 1. The bearing structure 30 includes a shaft 31 having a sprocket 32 driven by a chain 33 connected with a sprocket 34 adapted to be rotated by the knob 10.

In order to accurately align the openings and the particular group of numerals to be used I have provided a detent mechanism which assures that each of the numerals in the group selected will positively register with its opening. This mechanism is shown in FIGURES 2 and 5 and comprises a plurality of notches 35 formed on the edge of the numeral plate and these cooperate with a spring-loaded follower 36 which is mounted on a pivot 40 connected with the frame. The spring 41 urges the head of the follower into engagement with the notches. When the follower head is engaged with a notch (as shown in FIGURE 2) the numeral plate is in position for accurate resisting of the openings and the numerals for a load range.

The window plate 2 is fixedly secured to the frame 1 by means of several centrally located spacers and screws 42 (FIGURE 3). An aperture 43 in the numeral plate accommodates the spacers and screws 42. The outer edge of the window plate is held fast by means of a spacer ring 44. The spacer ring 44 bears on the plate which in turn bears on several washers 45 engaging the ends of the blocks 23. The ring 44, washers 45, bearings 22 and the blocks 23 are all held together by the screws 46. The washers 45 maintain separation between the numeral plate and window plate.

In front of the window plate is a glass or otherwise transparent member 47 which is held on the spacer ring 44 by means of the clips 50 (FIGURE 4).

Another important feature of the invention is in the mechanism which provides for making the various numerals readily and prominently visible to the machine operator.

With reference to FIGURE 3 it will be noted that the transparent member 47 and the window plate are spaced apart. The window plate is spaced from the numeral plate and the numeral plate is in turn spaced from the frame 1. Light can enter into the space between the frame and the numeral plate and the space between the two plates via the peripheral areas of the same because the peripheral areas of these two spaces are open except at the points of location of the bearings and block elements (22 and 23). Also light can enter into the space between the transparent member 47 and the window plate 2 via the peripneral area because the spacer ring 44 is made of translucent material. In the present embodiment the source of light is an annular-shaped neon tube 51 which is connected with the frame 1 by the block assembly 52. In order to enhance the transfer of light an annular cover or rim 53 extends between the frame 1 and the transparent member 46. Preferably the inside of the rim 53 has good light reflecting surface, for example it may be coated with white or aluminum paint. Further, the portion 54 of the frame facing the peripheral area of the numeral plate 19 is provided with an annular reflecting surface such as white or aluminum paint.

In FIGURE 4 I have shown somewhat diagrammatically by the dotted arrows how the light is transferred and reflected into the various spaces mentioned. The light indicated by the dotted arrow 55 floods the peripheral area of the window illuminating the scale 3 and the various openings 5. The light indicated by the dotted arrow 56 entering the space between the numeral plate and window plate provides illumination for the various groups of numerals of the plate. The light entering the space between the frame and the numeral plate indicated by the dotted arrow 57 is utilized as described below.

The numeral plate is made of a translucent material, for example a white plastic, and the various numerals on the numeral plate are printed in color and preferably different colors. For example, the numerals comprising one range of load may be red while the numerals comprising the other range of load may be green, etc. The material forming the various numerals and the material forming the numeral plate should have light transmission characteristics which provide for a distinctive optical contrast. In other words, when the light from the lamp 51 is transferred through the materials of the plate and numerals, the numerals appear as a bright red, or bright green or whatever the color might be. Where the numerals are black so that there is very little or no light transmission the effect is for the black numerals to stand out against a white background.

While the above arrangement for the numeral plate is preferred it will be understood that the plate may be made of material whose transmission characteristics are to block the light. In this event, the numerals are formed by insert means, for example inserts of clear or colored plastic. The different optical contrast is provided by the light being transmitted through the inserts to make a bright numeral with a dull or muted background, the muted background being provided in part by the transmission of light into the space between the numeral and window plates.

In FIGURE 7 I have shown a modification of the invention. This is particularly useful for testing machines having a range capacity which is greater than the normal number of ranges. In FIGURE 7 it will be noted that the group of openings 60 on the window plate 61 are disposed radially outwardly from the group of openings 62. Also, assemblage of numerals 63 on the numeral plate 64 are disposed outwardly of the assemblage of numerals 65. The loci of the windows or openings 60 and 62 and of the outer assemblage 63 and inner assemblage 65 is indicated by the dotted line $L_3$.

The numerals constituting a load range are staggered as between the outer assemblage 63 and the inner assemblage 65. For example, in FIGURE 7 the machine is set up for the 40,000 lb. range. The zero load indication in the outer assemblage lies within the first of the outer group of openings 60, while the 2,500 lb. load indication in the inner assemblage lies within the first of the inner group of openings. The 5,000 lb. load indication lies within the second of the outer group of openings; the 7,500 lb. load indication lies within the second of the inner group of openings and so on around the scale. As will be apparent, the same is true for the other load ranges.

The foregoing arrangement has the distinct advantage of permitting a large number of range loads without a normally large diametered indicating mechanism as would be the case if the windows and numerals were arranged in line or as described in connection with FIGURE 1.

While I have shown the various openings or windows to be elongated, it will be apparent that other shapes are possible. However, the shape of the window as shown is preferred inasmuch as it provides for minimum spacing between numerals.

In passing it is to be observed that the function of the openings or windows is to permit the viewing of a group of numerals comprising a load range while masking out other numerals for the other load ranges. As described above, the openings are actual apertures or holes and, if desired, the came may be closed off by a fill of clear plastic or by a plastic band connected with the back of the window plate. In such an instance it is required that the function of the openings as stated above be maintained.

I claim:
1. Load indicating apparatus for indicating a plurality of load ranges, the apparatus comprising:
   a frame having an annular reflecting surface;
   a disk-like numeral made of light transmitting material mounted on said frame for rotation about a horizontal axis, the numeral plate being spaced from said frame in a direction along said rotational axis;
   light means connected with said frame and disposed about the periphery of said numeral plate for transmitting illumination into the space between said frame and said numeral plate so that said reflecting surface will reflect the light through said numeral plate;
   light transmitting means forming a plurality of sets of numerals on the face of said numeral plate, each set indicating load values for a load range, the numerals being disposed around the periphery of the plate and each numeral being located along a radius with the viewing axis of the numeral oriented transverse its radius, the locus of the numerals being an annulus;
   a disk-like window plate spaced from said numeral plate in a direction along said rotational axis and fixedly interconnected with said frame, the window plate having a plurality of elongated openings exposing numerals and the numeral plate to view and the locus of the openings being an annulus coaxial with first said annulus and the numerals as viewed through the openings being in the normal reading position;
   spacer ring made of light transmitting material extending around the periphery of said window plate and fixedly interconnected therewith;
   a disk-like transparent member mounted on said spacer ring;
   an annular-shaped ring extending between said frame and the periphery of said transparent member and forming a closure for said light means, said window plate and said numeral plate, the annular-shaped ring having a reflecting surface reflecting light from said light means through said light transmitting member onto the peripheral area of said window plate occupied by said windows; and
   means to rotate said numeral plate to bring a single set of said numerals into alignment with said openings and thereby be exposed to view through said transparent member, the material of said numeral plate and the material of said numerals having different light transmitting characteristics so that as viewed there is different optical contrast between the numerals and the plate.

2. Load indicating apparatus for indicating a plurality of load ranges, the apparatus comprising:
   a frame having an annular reflecting surface;
   a disk-like numeral plate made of light transmitting material mounted on said frame for rotation about a horizontal axis, the numeral plate being spaced from said frame in a direction along said rotational axis;
   light means connected with said frame and disposed about the periphery of said numeral plate for transmitting illumination into the space between said frame and said numeral plate so that said reflecting surface will reflect the light through said numeral plate;
   light transmitting means forming a plurality of sets of numerals on the face of said numeral plate, each set indicating load values for a load range, the numerals being disposed around the periphery of the plate and each numeral being located along a radius with the viewing axis of the numeral oriented transverse its radius, the locus of the numerals being an annulus;
   a disk-like window plate spaced from said numeral plate in a direction along said rotational axis and fixedly interconnected with said frame, the window plate having a plurality of elongated openings exposing numerals and the numeral plate to view and the locus of the openings being an annulus coaxial with said annulus and the numerals as viewed through the openings being in the normal reading position;
   a spacer ring made of light transmitting material extending around the periphery of said window plate and fixedly interconnected therewith;
   a disk-like transparent member mounted on said spacer ring;
   an annular-shaped ring extending between said frame and the periphery of said transparent member and forming a closure for said light means, said window plate and said numeral plate, the annular-shaped ring having a reflecting surface reflecting light from said light means through said spacer ring onto the peripheral area of said window plate occupied by said windows; and
   a gear segment on said numeral plate and a pinion on said frame cooperating to rotate said numeral plate to bring a single set of said numerals into alignment with said openings and thereby be exposed to view through said transparent member, the material of said numeral plate and the material of said numerals having different light transmitting characteristics so that as viewed there is different optical contrast between the numerals and the plate.

3. A construction in accordance with claim 2 further including detent means for controlling the alignment between said windows and said sets of numerals, the detent means comprising a plurality of notches formed on the periphery of said numeral plate and a cooperating spring loaded follower mounted on said frame.

4. Load indicating apparatus for indicating a plurality of load ranges, the apparatus comprising:
   a frame;
   a disk-like numeral plate made of light transmitting material mounted on said frame for rotation about a horizontal axis, the numeral plate being spaced from said frame in a direction along said rotational axis;
   a light means connected with said frame for projecting illumination into the space between said frame and said numeral plate and through said numeral plate;
   a light transmitting means forming a plurality of sets of numerals on the face of said numeral plate, each set indicating load values for a load range, the numerals being disposed around the periphery of the plate and each numeral being located along a radius with the viewing axis of the numeral oriented transverse its radius, the locus of the numerals being an annulus;

a disk-like window plate spaced from said numeral plate in a direction along said rotational axis and fixedly interconnected with said frame, the window plate having a plurality of elongated openings exposing numerals and the numeral plate to view and the locus of the openings being an annulus coaxial with first said annulus and the numerals as viewed through the openings being in the normal reading position;

a disk-like transparent member mounted on said window plate and spaced from the window plate in a direction along said rotational axis;

means to transmit illumination into the space between said window plate and said transparent member onto the peripheral area of said window plate occupied by said windows; and means to rotate said numeral plate to bring a single set of said numerals into alignment with said openings and thereby be exposed to view through said transparent member, the material of said numeral plate and the material of said numerals having different light transmitting characteristics so that as viewed there is different optical contrast between the numerals and the plate.

References Cited in the file of this patent

UNITED STATES PATENTS

| | | |
|---|---|---|
| 1,511,490 | Ashcroft | Oct. 14, 1924 |
| 1,942,343 | Melik-Minassiantz | Jan. 2, 1934 |
| 2,004,724 | Herzog | June 11, 1935 |

UNITED STATES PATENT OFFICE

CERTIFICATE OF CORRECTION

Patent No. 3,092,072                                        June 4, 1963

Robert S. Strimel

It is hereby certified that error appears in the above numbered patent requiring correction and that the said Letters Patent should read as corrected below.

Column 2, line 32, after "numerals" insert -- 14, --; column 3, line 13, for "600 ib." read -- 600 lbs. --; line 21, for "change" read -- chance --; column 4, line 14, for "peripneral" read -- peripheral --; column 5, line 27, for "came" read -- same --; line 35, after "numeral" insert -- plate --; column 6, line 31, after "with" insert -- first --;

Signed and sealed this 10th day of December 1963.

(SEAL)
Attest:
ERNEST W. SWIDER

EDWIN L. REYNOLDS

Attesting Officer                                  Acting Commissioner of Patents